June 6, 1967 — W. SICHAK ET AL — 3,324,251
ELECTRONICALLY VARIABLE DELAY
Filed March 10, 1964 — 5 Sheets-Sheet 1

INVENTORS
WILLIAM SICHAK
JACK B. HARVEY
ROBERT T. ADAMS
BY Hopgood & Calimafde
ATTORNEYS

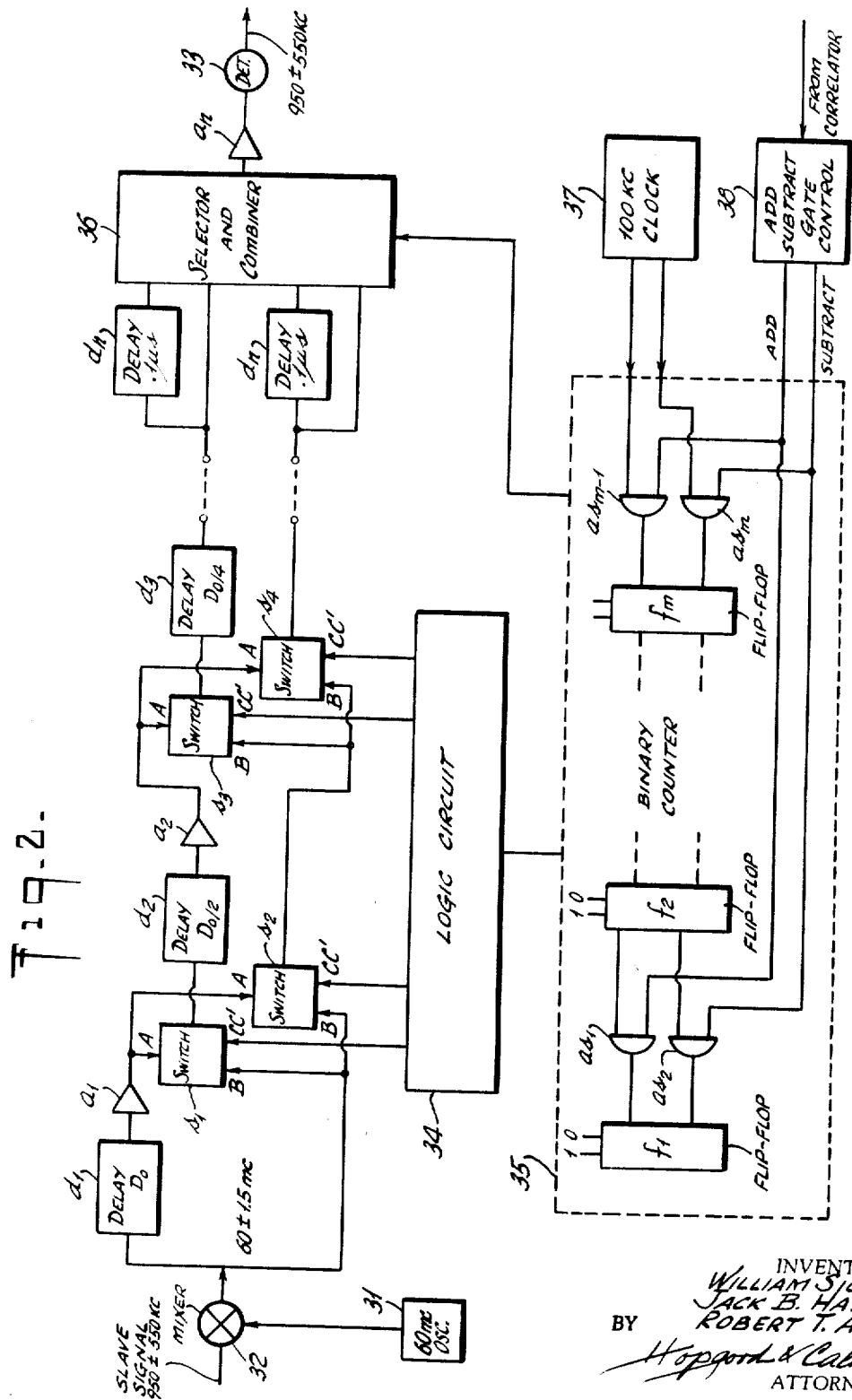

INVENTORS
WILLIAM SICHAK
JACK B. HARVEY
ROBERT T. ADAMS
BY
Hopgood & Calimafde
ATTORNEYS

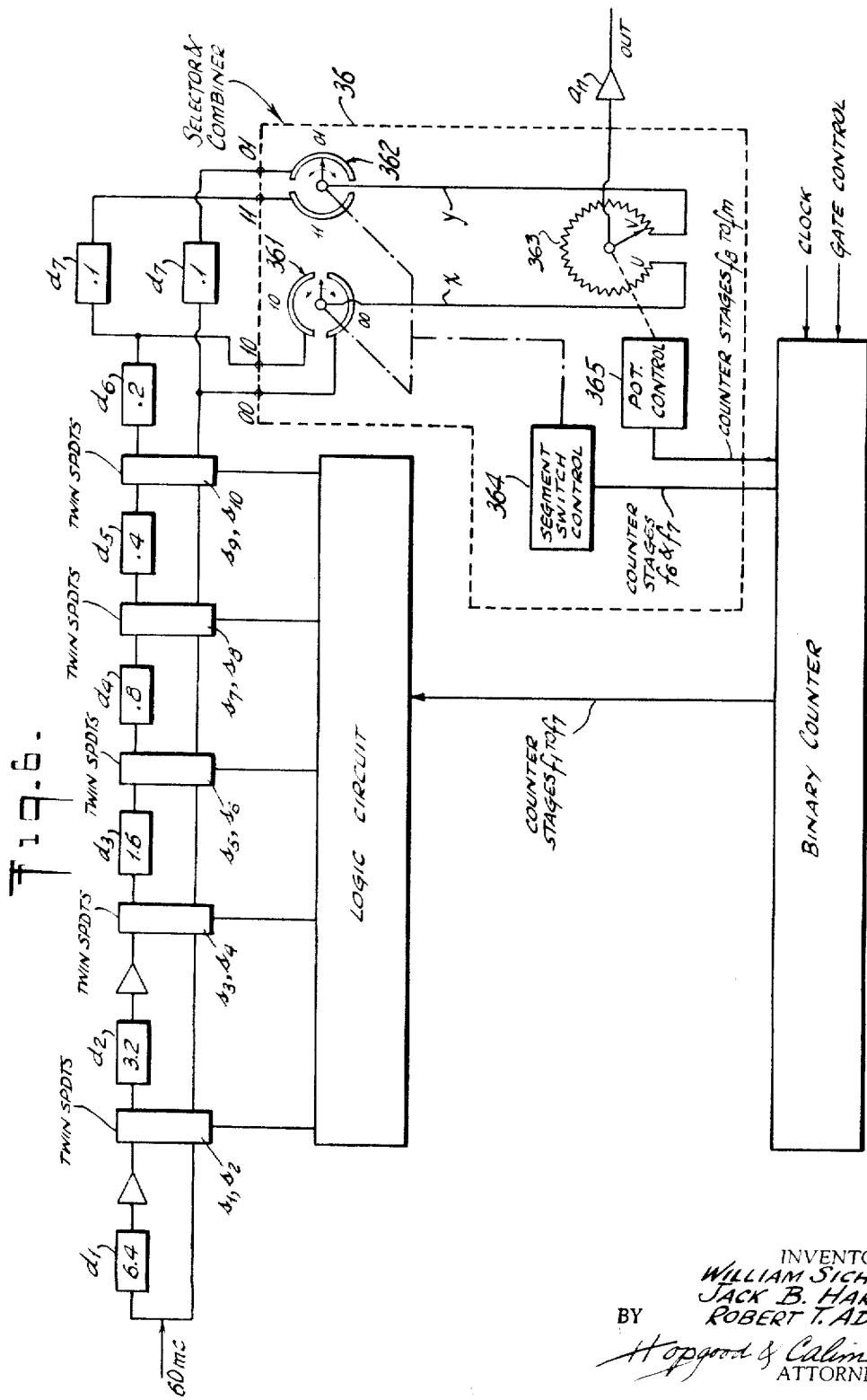

United States Patent Office 3,324,251
Patented June 6, 1967

3,324,251
ELECTRONICALLY VARIABLE DELAY
William Sichak, Nutley, Jack B. Harvey, Clifton, and Robert T. Adams, Short Hills, N.J., assignors, by mesne assignments, to Communication Systems, Incorporated, Carson City, Nev., a corporation of Nevada
Filed Mar. 10, 1964, Ser. No. 350,908
17 Claims. (Cl. 179—100.2)

This invention relates to an arrangement for fixedly or variably delaying an incident signal in response to an electrical indication.

In various applications, it is necessary to have a variable delay, the value of which may be made to change relatively instantaneously in response to a control signal. Heretofore, several arrangements have been proposed which would effect such a result; each, however, exhibits significant disadvantages. For example, quartz delay sections are available which are mechanically adjustable to vary the delay, and although large delays (up to 5000 microsec.) may be introduced by such elements, the variation thereof mechanically is impractical for high speed applications. Lumped constant delays on the other hand, while adjustable in either the inductive or capacitive (or both) parameters at high speed, present problems in maintaining a stable characteristic impedance while undergoing variation. Moreover, while lump constant delays may be elementally cascaded and switched in order to effect the desired delay, the arrangement tends to become increasingly cumbersome in size when the requirements for a large delay arise. Further, the attenuation characteristics of this type of device introduce problems of compensation not easily soluble without resort to a large amount of additional equipment. Arrangements, such as signal storage in, for example, a matrix memory with subsequent feed-out at a time-designated by the delay required, becomes grossly unpractical (at 3 mc. bandwidth, a 6 million bit storage is required) when wideband applications are considered. Needless to say, other conventional delay devices raise similar objections.

Accordingly, it is an object of this invention to provide an electronically variable delay circuit capable of high speed wideband application with a minimum of distortion and cost.

It is another object of the invention to provide an electronically variable delay circuit, the delay capabilities of which may be increased by factors of two or more without a corresponding increase in size, complexity or cost.

It is another object of this invention to provide an electronically variable delay circuit easily controllable by analog or digital signals.

It is another object of this invention to provide an electronically variable delay circuit which exhibits a smooth transition upon variation, obviating signal and information loss as a result of switching transients.

It is a still further object of this invention to incorporate the electronically variable delay circuit of the invention in a novel arrangement for optimally combining taped data.

Briefly, the invention is predicated upon the concept of employing fixed delay sections in successive binary ratio in conjunction with a bi-directional counter and logic network; the latter being employed to translate the counter outputs, and appropriately set switches, disposed between the delay sections, in accordance therewith. The counter itself is driven in response to a signal applied thereto.

The above mentioned and other features and objects of this invention and the manner of attaining them will become more apparent, and the invention itself will be best understood by reference to the following description of an embodiment of the invention, taken in conjunction with the accompanying drawings, wherein:

FIG. 2 is a combined block and block detail of the delay and delay control circuit of the invention;

FIG. 6 illustrates in greater detail the selector and combiner circuit of FIG. 2 and its relationship to the delay line and counter.

In the following, an arrangement embodying the inventive concept is discussed with reference to its incorporation in a novel system for optimally combining several telemetry tape recordings into one, and automatically producing the best composite record obtainable from these overlapping individual records obtained by stations having only partial coverage of the missle trajectory.

When combining tape recordings, particularly those derived from telemetry signals, the quality of the composite data is of primary importance. One of the greatest problems involves the slaving together of separately recorded wideband signals with sufficient accuracy and speed of response to maintain coherent addition despite rapidly fluctuating errors in relative timing. These errors arise from the eccentricity of the capstan and various other mechanical problems effecting tape translation in the reproducers, which give rise to "wow" and "flutter." It is to be noted that even the finest reproducers exhibit timing fluctuations of ±100 to 300 µs.

Figure 1:
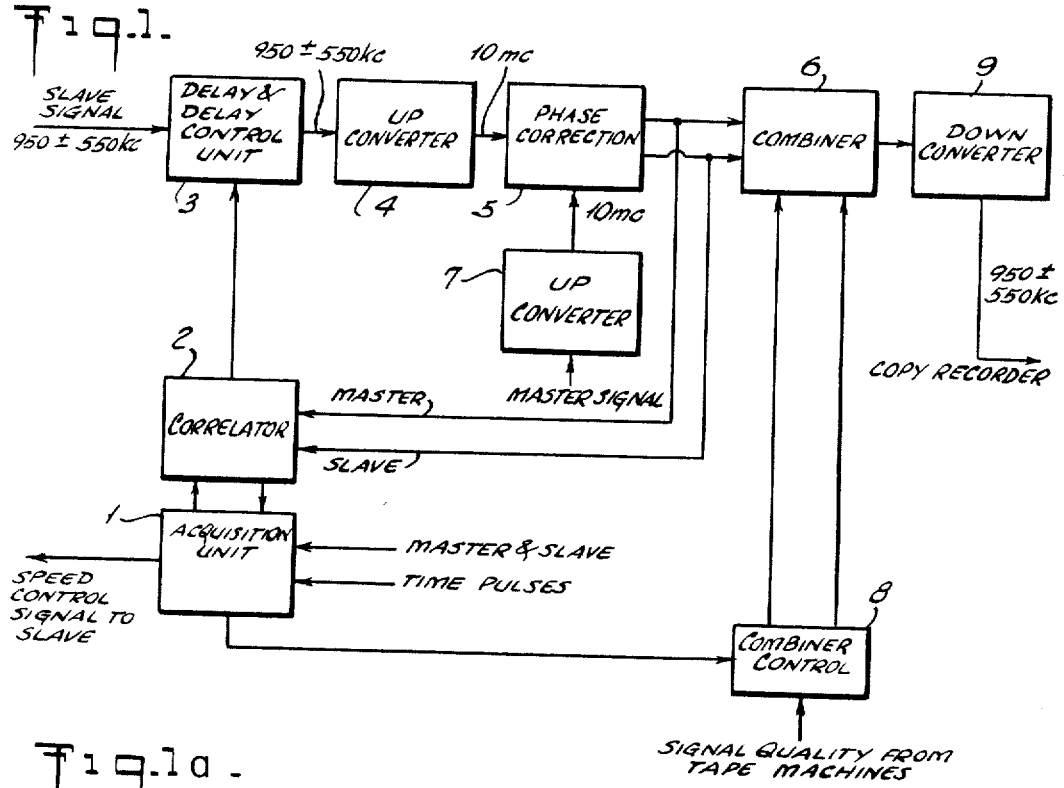
FIG. 1 illustrates a flow diagram of a tape-combining system embodying the invention.

FIG. 1 illustrates an arrangement for compensating for such errors. The depicted arrangement pertains to the predetection diversity combining of two tapes, one of which is arbitrarily designated the "master"; the other being the "slave" to which the corrections are applied. Should it be desired to combine more than two tapes, redundant circuitry will be employed; again with a single tape acting as master.

Figure 1A:
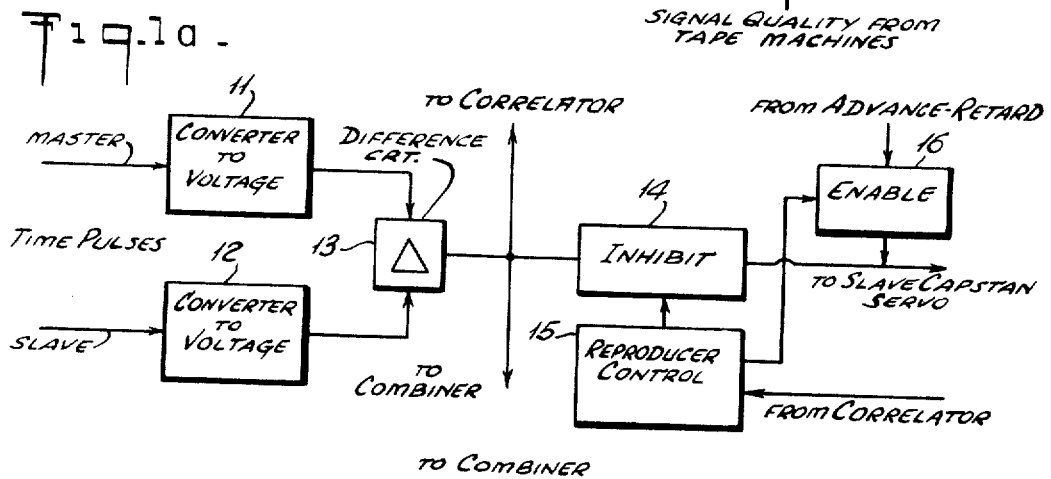
FIG. 1(a) is a block detail of the acquisition unit of the tape-combining system of FIG. 1.

Initially, relative tape positioning is accomplished manusually so that the slave is several milliseconds behind the master. This time displacement is chosen to be somewhat greater than the maximum expected error and is accomplished by matching as closely as possible the time pulses (standard in telemetry tapes) stored in the tapes, with a predetermined $\Delta t$ offset. Both tapes are then set in motion and the master and slave time pulses converted into voltages by the converters 11 and 12 (FIG. 1(a)) of the acquisition unit 1. The difference between these voltages is then applied to the slave capstan servo (not shown) by the difference circuit 13 to increase the speed of the slave reproducer by 1% until an output from the correlator 2 (FIG. 1) is obtained. Upon time pulse synchronism, the correlator 2 and combiner 8 are enabled thus avoiding their functioning at what might be false correlation within another time period.

At this juncture it might be well to point out that although the timing pulses provide some degree of tape correspondence, time codes recorded at different stations, may differ by as much as 10 millisec., and another 15 millisec. discrepancy is possible due to differences in propagation time; hence correlation is not necessarily effected time code correspondence. The difference circuit 13, therefore, is adapted to apply a constant bias when the indicated time difference is zero to ensure hunting will continue.

When correlation is obtained, the operation of the acquisition unit is inhibited via the inhibitor 14, which is controlled by the correlator through the reproducer control 15. The correlator produces a control voltage for the delay and delay control unit 3 by correlating the master and slave wideband predetection signals directly, indicating by a plus or minus whether the relative timing of the slave is advanced or retarded. Since correlation may be indicated at several ambiguous points, spaced in multiples of the commutation period, a comparison of demodulated data may be employed to resolve ambiguities. Inasmuch as the correlator "sees" the slave signal subsequent to delay and phase adjustment, initially the delay is preset to one-half the total delay to allow flexibility in either direction. As noted previously, upon correlation being obtained, the acquisition control is inhibited. Slave reproducer speed control from this point on will be explained in connection with the description of the delay and delay control unit 3.

Figure 1B:
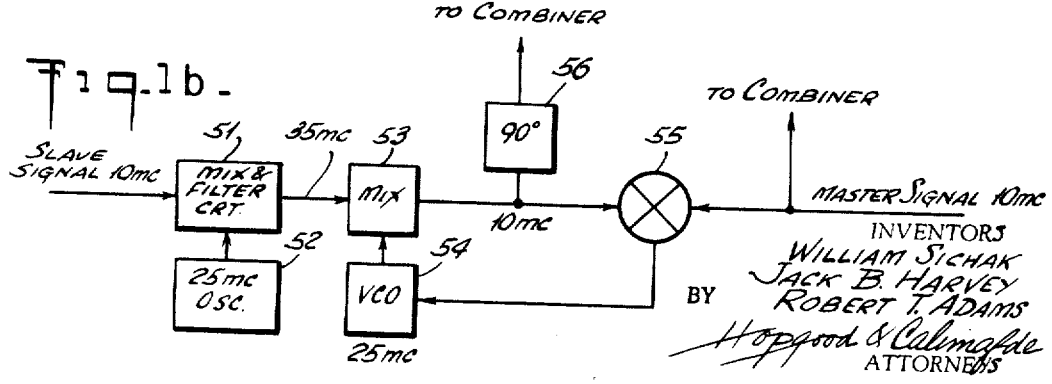
FIG. 1(b) is a block detail of the phase-correction unit of the tape combining system of FIG. 1.

Before undertaking a detailed description of this unit, however, the remaining elements of FIG. 1 will first be described so that the delay and delay control unit's function in the basic system may be appreciated. The slave signal from the delay and delay control unit 3, having been suitably delayed to insure time coincidence with the master, is fed via an up converted 4 to the phase correction circuit 5. The function of the latter is to remove phase and frequency errors caused by transmitting and receiving oscillators, Doppler effect, etc. As shown in the detail FIG. 1(b), the slave signal is heterodyned with a carrier, obtained from oscillator 52, and filtered to remove the image by the mixer and filtering circuit 51. The resultant signal and the output from the voltage controlled oscillator 54 is fed to the mixer 53, which, in turn, feeds the combiner 6 (FIG. 1) through the 90° phase shifter 56. Any difference in phase or frequency between the master and slave signals is noted by the quadri-comparator 55 which shifts the voltage control oscillator so that the slave output to the combiner is in phase quadrature with the master signal. The master signal meanwhile has undergone a frequency change by virtue of the up converter 7 (FIG. 1) so that it may coincide in frequency, at the comparator 55, with the slave signal. The phase shifter 56, it may be noted, compensates for the quadri-correlation.

The combiner 6 performs maximal ratio combining of the now compensated signals. Control voltages may be obtained from the recorded AGC signals or by rectifying out of band noise in the combiner control 8. Both methods are well known and hence will not be described further, save to note that it may be desirable, because of tape dropout, to employ both methods simultaneously.

The master and slave combined signal is now reduced in frequency by the down converter 9 and may be recorded on a single track.

The delay and delay control unit 3 of FIG. 1 will now be described in detail with reference to FIGS. 2–6. Included in FIG. 2, primarily, to maintain the simplicity of the block diagram of FIG. 1, are the local oscillator 31, mixer 32 and detector 33 associated with the delay line, of the delay and delay control unit. These units serve to fulfill the bandwidth requirement of the line (which in turn is dictated by the bandwidth of the slave signal); the first two by providing a double side band amplitude modulated signal at 60 mc., which may upon emerging from the delay line, be detected by the third to again produce the fundamental slave frequency.

The delay and delay control unit, consists essentially of three parts: a delay line comprising delay sections $d_1$–$d_n$ and interstage switches $s_1$, $s_2$ . . . operating at 60 mc.; a control circuit which includes a logic circuit 34 and a bidirectional binary counter 35; and a selector and combiner 36. Each delay section is composed of a delay unit and where necessary an amplifier. For long delays (up to 5000 μs.), quartz delay sections operating at carrier frequencies of 60 mc. are used. For short delays, up to and including 0.8 μs. RG–55 coaxial cables are used. Amplifiers $a_1$ . . . $a_n$ are required to compensate for the attenuation of the larger quartz delays individually and the conglamorate cable and small quartz delay losses. The delay sections are adjusted for a constant transmission gain (or loss) so that the output power is independent of the delay setting. To facilitate adjustment of the amplifiers a 59 mc. amplitude reference may be monitored and each delay section or group adjusted in turn (not shown).

The delay introduced by each successive delay section is one-half that of the preceding section. The total delay range D is therefore:

$$D = D_o\left(-\frac{1}{2^n}\right) = D_n(2^n - 1)$$

where:

$D_o$ = largest section delay
$D_n$ = smallest section delay

This provides a system optimum in the sense that doubling the delay increases the complexity and cost by $(1+n)/n$ whereas for other systems, doubling the delay doubles the complexity and cost. Thus, for a delay range of 819.11 μs., only 13 sections with delays of 409.6, 204.8, 102.4 . . . 6.4, 3.2 . . . .2 and .1 μs. are required. This range of delay allows the mis-phasing loss to be held to less than 1 db. For purposes of illustration, however, the description following will only include sections sufficient in number for understanding the function being analyzed.

The delay at any instrument is controlled by the switches $s_1$, $s_2$ . . . which are in turn controlled by the binary counter 35 via the logic circuit 34. The binary counter 35 is bidirectional, adding or subtracting the least significant binary digit in response to the polarity of the correlator output; accumulating a count upon its flip-flop stages $f_1$, $f_2$ . . . equal to the desired delay. Counter stepping is accomplished in response to 100 kc. clock pulses, the source 37 of which is connected to interstage control gates $as_m$ and $as_{m-1}$ within the counter which have applied thereto, as do the gates $as_1$, $as_2$ . . . , the add-subtract gate control signals. The add-subtract gate control 38 is in turn controlled by the plus-minus error signal of the correlator. Such bidirectional binary counters are well known and it will be appreciated that the one illustrated has been abbreviated in detail for purposes of clarity.

Since the value of delay employed is controlled by a bi-directional counter whose value, when changing, always steps binary serially (e.g. 1000–0111–0110 etc.) the delay employed may change in like fashion (e.g. 6.4–6.3–6.2), and thus minimal transitions are ensured.

The arrangement described thus far has not taken into account switching transients and the inherent loss of information produced in wideband applications, such as the tape combiner embodiment, by the quantization of time delay. This transient effect is obviated by having two auxiliary delays for each primary operating delay. These delays are of a value one delay unit less and one delay unit larger than the primary delay. Representing the required delay as a binary number, a typical situation is:

| Delay increment | 1.6 | .8 | .4 | .2 | .1 |
|---|---|---|---|---|---|
| Auxiliary delay | 1 | 0 | 0 | 0 | 1 |
| Primary delay | 1 | 0 | 0 | 0 | 0 |
| Auxiliary delay | 0 | 1 | 1 | 1 | 1 |

The first line represents a delay of 1.7 μs., the second a delay of 1.6 μs., and the third 1.5 μs. The primary and auxiliary delays are automatically set up by the logic circuit as will be explained, and as the primary delay changes so do the auxiliary delays. This permits a fading in and out of delays by the selector and combiner 36 in the desired direction. Thus, for example, if a delay of 1.6 μs. is required by the correlator 2 via the counter, and this is varied in either direction, one of the auxiliary delays (that in the appropriate direction) is faded in while the primary is faded out. The auxiliary delay now attains primary status.

Figure 3:
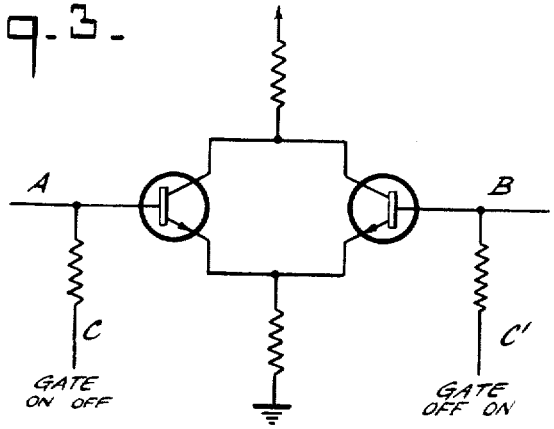
FIG. 3 is a schematic illustration of one of the switching elements disposed between the delay sections in the variable delay line of FIG. 2.

The proper cascading of delay sections is determined by the setting of the switching elements shown in FIG. 3; each of which selects the connection preceding delay or by-pass to succeeding delay, or preceding delay or by-pass to succeeding by-pass (see FIG. 20). These switching elements are designed to have a high impedance input and a low load impedance, so that the same amount of power is delivered to each of one or two succeeding sections. Each switch connects one of two inputs (A or B) to a common load, depending upon which side, C or C', is gated "on" or "off." This transistor circuit minimizes switching transients and is preferred to a diode switch, whose loss depends somewhat upon the signal level.

The switch elements themselves are controlled via logic circuit 34 by the setting of the counter flip-flops. Thus, the counter ultimately determines which delay is primary, as well as the auxiliary connections. The setting of switches at a given interstage is determined by the count (0 or 1) stored in the preceding stage, and in the two following stages of the counter.

Figure 4A:
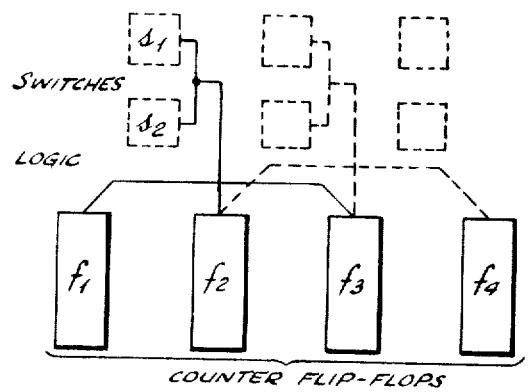
FIG. 4(a) illustrates the relationship between counter stages or flip-flops, logic, and switches of FIG. 2.
Figure 4B:
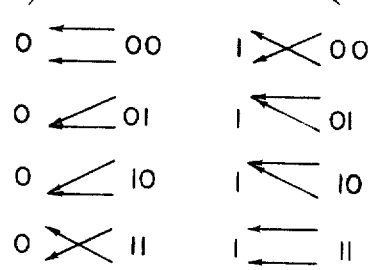
FIG. 4(b) shows the switched connections for each of the eight possible conditions of three counter elements.
Figure 4C:
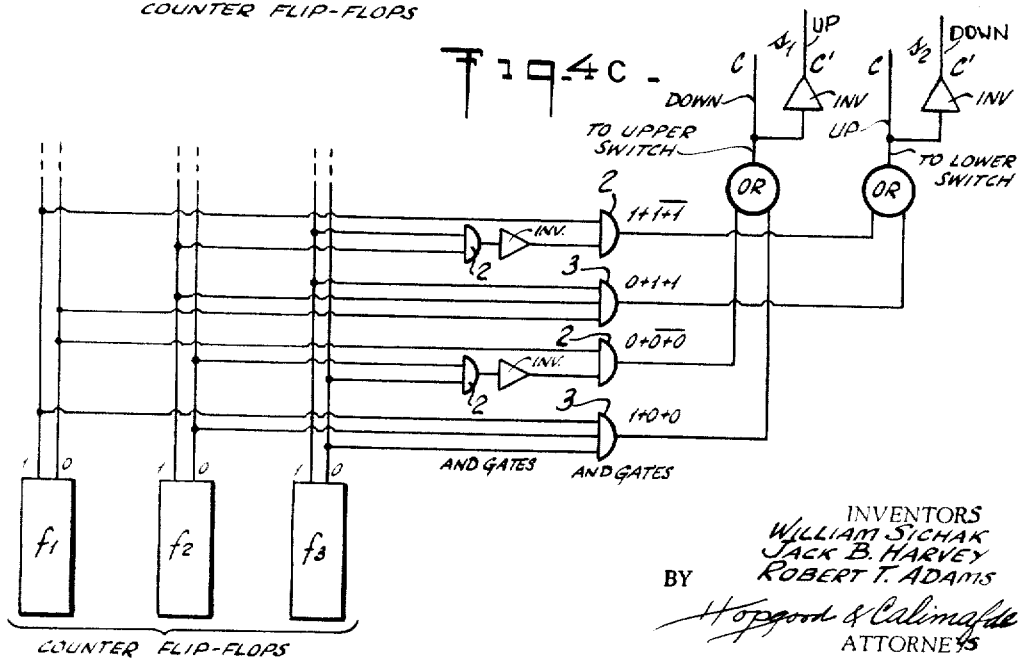
FIG. 4(c) is a schematic illustration of the logic circuit connected between three counter stages and a pair of switches.

FIG. 4(a) illustrates the flow just described while FIG. 4(b) shows the switched connections for each of the eight possible conditions of three adjacent counter stages. In this figure the upper arrows represent the condition of the upper switch (e.g. $s_1$) while the lower arrows represent the condition of the lower switch (e.g. $s_2$. FIG. 4(c) illustrates the logic arrangement, contained in logic circuit 34 of FIG. 2, for controlling the switches by the counter stages. While only three counter stages, associated logic and one set of switches are shown, the complete arrangement is redundant as will be appreciated. Since such circuits are well known in the art, this one will not be described in detail. Suffice to say that in accordance with the logic of FIG. 4(b) the upper switch $s_1$ should be in the upper to lower condition when the counter stages $f_1$–$f_3$ exhibit conditions $0+\overline{0+0}$ or $1+0+0$ and in the upper to upper condition when these stages exhibit NOT the foregoing conditions. The lower switch $s_2$, on the other hand, should be in the lower to upper condition when these stages exhibit conditions $1+1+1$ or $0+1+1$ and in the lower to lower condition when these stages exhibit NOT the foregoing conditions. The depicted arrangement of "AND" gates (shown with a number in half circle) "OR" gates (OR in a circle) and inverters (INV in a triangle) fulfill these requisites.

Figure 5:
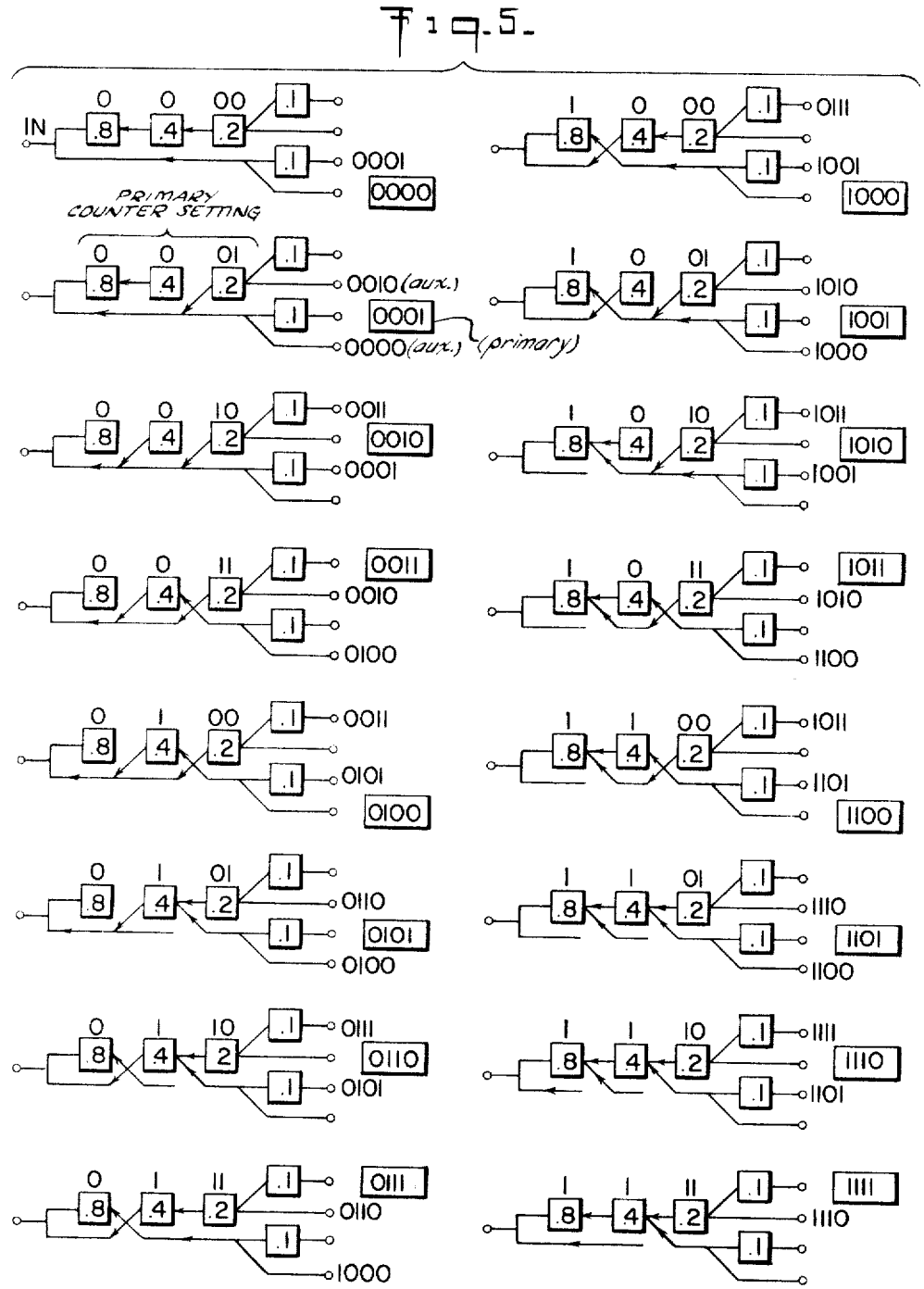
FIG. 5 shows the sixteen possible states of a four-element switched delay line.

FIG. 5 illustrates the sixteen possible states of a four element switched delay line controlled by a four stage binary counter. At this juncture it is well to point out that in the embodiment described each switch-set (not each delay section) is controlled by the preceding and two following counter stages. Hence in FIG. 5 there are but two switch-sets controlled by four stages. The last delay section is duplicated in order to provide a section of four outputs from which the primary and auxiliary delays may be obtained. In this figure, which is arranged to show increasing binary value (and hence delay) from top to bottom in first the left, and then the right column, the boxed binary values correspond to the primary delay setting, whereas the remaining binary numbers above and below it are the auxiliary delays. This present arrangement of primary and auxiliary delays ensures that the data has "filled" the preset delay sections, so that when an increase or decrease of one unit is made, the signal output will be available immediately. It may be noted that no matter what the primary setting the auxiliary delays are located on either side of it in the same order of ascendency (when the outputs are considered to be arranged in a circle). Moreover, the arrangement obviates any interference between the auxiliary and primary delayed signals since the initial signal never takes a path which rejoins a neighboring signal path.

Where the variable delay line is to be embodied in less sophisticated systems (i.e. where transient affects are less significant) it is possible with the invention to eliminate the four outputs and use a single output termination. In such a case primary and auxiliary delays could not of course be available simultaneously, however, the logic is considerably simplified since each switch set need only be controlled by the two adjacent counter stages via, for example, a pair of "or" gates and a binary to one-out-of-four converter.

At this point, before examining the selector and combiner circuit 36 in more detail with reference to FIG. 6, it might be well to refer back to FIGS. 1 and 1(a), particularly with respect to the slave servo speed control by the acquisition unit 1. It will be remembered that, upon correlation, this control has been inhibited within the acquisition unit. It may now be seen that inasmuch as the counter itself reflects the required delay and exhibits in effect an indication of slave reproducer speed, it may be utilized to directly control the slave servo. Hence, the advance-retard signal shown in FIG. 1(a) may be obtained by sensing a "1" and "0" in the most significant digit position of the counter (stage $f_1$). A "1," for example, indicates that the operating delay is greater than one-half the total delay available, and a corresponding output to the slave servo decreases the speed of the slave reproducer, thus maintaining slave speed within the limits of the delay line capability. The passing of control, over slave reproducer speed, from the difference circuit 13 to the counter is effected by the correlator via the reproducer control 15, which simultaneously activates the inhibit circuit 14 and the enable circuit 16. Upon initial correlation there will be a tendency towards overshoot since the "0" in the first significant digit of the counter calls for increasing slave speed and the delay line is falling off rapidly, however, the correlator now exhibits a negative signal calling for more delay and the counter responding increases its value till a "1" appears in the most significant digit which in turn retards the slave servo. When correlation becomes positive less delay is called for and so on; master and slave signal coincidence being ensured by the delay line regardless of "wow" and "flutter." Each time the difference between master and slave speed would tend to overrun the delay line the advance-retard signal serves to obviate such a result by changing the slave speed accordingly.

In FIG. 6, each set of interstage switches is, for the sake of simplicity, grouped within a single box labeled "twin SPDTS" (single pole double throw switches). The selector and combiner, which is illustrated conceptually, comprises a switching arrangement for selecting the primary and operational auxiliary delay and means for varying the emphasis between these signals. While as a practical matter the switching is done electronically and the emphasis is supplied by fading in and out variable gain amplifiers, the conceptual arrangement depicted serves to vividly illustrate the functional relationships among the elements. The electronic circuit, which may be easily derived from the shown schematic by those versed in the logic art, has for the sake of brevity been omitted, however, recourse may be had to the following references for examples: H. Allen Curtis, "The Design of Switching Circuits" (D. Van Nostrand Co.); "Reference Data for Radio Engineers" 4th edition, Chapter 30 (ITT Corp., N.Y.); C. L. Mack "Diversity Reception in UHF Long Range Communication" Proc. IRE, vol. 43, October 1955, p. 1281 et seq.

The four delay line outputs are led to a pair of segmented switches 361 and 362 whose respective rotary contacts are driven in common by the switch control 364. When the segments are disposed, and connected to the delay line outputs, as shown, it may be seen that no matter which rotor contact is located centrally of a segment the other rotor contact sits in a "crack" on either side of which the auxiliary delays are present. If for example the primary delay were 11101, auxiliary delays 11100 and 11110 would be on standby. this obtains no matter which lead X or Y the primary delay appears on. The necessity for two standby delays rests on the fact that it is not known which direction the counter will take next; i.e. whether the correlator will call for more or less delay. The segment switch control 364 positions the rotors in response to the counter stages $f_6$ and $f_7$ which are additionally the least significant counter stages for controlling the delay line switches $s_9$, $s_{10}$ (in conjunction of course with stage $f_5$). Since the rotor control bypasses the circuit it is responsive to only the primary delay indication. However, as has been described the disposition of the segments assumes the responsibility for auxiliary delays. When the rotor begins to rotate in response to a new count, an auxiliary segment is immediately picked up on one of the leads X or Y (X in the shown arrangement). The rotary potentiometer 363 assumes the function of fading out the primary and fading in the auxiliary which has now achieved primary status. The "pot" rotor is responsive to the pot control 365 which in turn is controlled by the least significant counter stages $f_8$–$f_m$ (where $f_m$ is dependent upon the degree of smoothness desired). The pot rotor will thus rotate clockwise and counterclockwise between the ends U and V; always appearing at that end which is appropriate for the primary segment when the counter is quiescent, and travelling to the other end when the counter steps.

The foregoing may be visualized as a gear train; the pot rotary undergoing approximately 360° of rotation for every 90° rotation of switch rotors. With this arrangement smooth delay transitions are ensured and an appropriately delayed slave signal is available at the output for transmission to the next circuit in the tape combiner system.

While we have described above the principles of our invention in connection with specific apparatus, it is to be clearly understood that this description is made only by way of example and not as a limitation to the scope of our invention as set forth in the objects thereof, and in the accompanying claims.

What is claimed is:

1. An electronically variable delay comprising: a plurality of successive delay sections each of a value one-half that of the preceding section; a delay section by-pass associated with each said delay sections; switch means connected between each delay section and associated by-pass and the succeeding delay section and associated by-pass for the selective cascading of said delay sections; means for setting each of said switch means in accordance with the desired delay, and means coupled to the last successive delay section and associated by-pass for selecting the desired delay.

2. An electronically variable delay as claimed in claim 1, in which said setting means comprises: a bi-directional binary counter having individual stage outputs for indicating thereon the desired delay in binary form; means connected to said counter for the setting thereof in response to an incident delay indication; and means coupling the counter stage outputs with said switch means for cascading said delay sections in accordance with the count contained in said counter.

3. An electronically variable delay as claimed in claim 1, in which each of said switch means comprises a pair of single-pole-double throw electronic switches the inputs of each of which are respectively connected in parallel between a delay section and associated by-pass, and the outputs of which are connected to the succeeding delay section and associated by-pass, respectively.

4. An electronically variable binary delay as claimed in claim 3, in which each of said electronic switches comprises a pair of transistors, the emitters and collectors of which are respectively coupled in parallel; one of said parallel connections serving as the output of said switch when the inputs are applied to the respective bases of said transistors.

5. An electronically variable delay comprising: a plurality of successive delay sections each of a value one-half that of the preceding section; a delay section by-pass associated with each said delay sections; switch means connected between each delay section and associated by-pass and the succeeding delay section and associated by-pass for the selective cascading of said delay sections; means for setting each of said switch means in accordance with the desired delay, an auxiliary delay a predetermined value greater and an auxiliary delay a predetermined value less than said desired delay; and means, including delay sections of said predetermined value, coupled to the last successive delay section and associated by-pass for simultaneously providing the desired and auxiliary delays.

6. An electronically variable delay as claimed in claim 5, in which each of said switch means comprises a pair of single-pole-double-throw electronic switches the inputs of each of which are respectively connected in parallel between a delay section and associated by-pass, and the outputs of which are connected to the succeeding delay section and associated by-pass, respectively.

7. An electronically variable delay as claimed in claim 6, in which said setting means comprises: a bi-directional binary counter having individual stage outputs for indicating thereon the desired delay in binary form; means connected to said counter for the serial stepping thereof in response to an incident delay indication; and means coupling the counter stage outputs with said switch means for cascading said delay sections in accordance with the desired and auxiliary delays.

8. The electronically variable delay as claimed in claim 7 further comprising means, connected to said means for simultaneously providing the desired and auxiliary delays, and responsive to predetermined counter stages for switching from the desired delay to either of the auxiliary delays upon the stepping of said counter.

9. The electronically variable delay as claimed in claim 8 further comprising means, connected to said means for switching, for fading out the desired delay and fading in the switched auxiliary delay.

10. The electronically variable delay as claimed in claim 9, in which the fade out fade in means is responsive to a plurality of the least significant counter stages.

11. An electronically variable delay comprising: a plurality of successive delay sections each of a value one-half that of the preceding section; a delay section by-pass associated with each of said delay sections; switch means connected between each delay section and associated by-pass and the succeeding delay section and associated by-pass for the selective cascading of said delay sections; a bidirectional binary counter having individual stage outputs for indicating thereon the desired delay in binary form; means connected to said counter for the serial stepping thereof in response to an incident delay indication; logic means coupled between each said switch means and the three successive counter stages indicating the preceding and two succeeding delays in binary form, for setting said switch means in accordance with the desired delay, an auxiliary delay a predetermined value greater and an auxiliary delay a predetermined value less than said desired delay; and means, including delay sections of said predetermined value, coupled to the last successive delay section and associated by-pass for simultaneously providing the desired and auxiliary delays.

12. The electronically variable delay as claimed in claim 11, in which the means for simultaneously providing the delays comprises: a pair of single input dual output circuits connected on their inputs to the last successive delay section and associated by-pass, respectively; each said pair of circuits comprising a delay section one-half the value of said last successive delay section, and an associated by-pass.

13. The electronically variable delay as claimed in claim 12 further comprising means coupled to the pair of dual outputs, and responsive to predetermined counter stages for switching from the desired delay output to either of the auxiliary delays upon the stepping of said counter.

14. The electronically variable delay as claimed in claim 13 further comprising means connected to said means for switching and responsive to a plurality of the least significant counter stages for fading out the desired delay and fading in the switched auxiliary delay.

15. A system for the maximal combining of the signals recorded on a master and at least one slave tape and derived by respective tape reproducers comprising: the electronically variable delay claimed in claim 12 for delaying the slave signal; means for correlating the master and variably delayed signals and indicating as a function of voltage the time lag and lead of slave signal relative the master signal; means connected to said correlating means for driving the binary counter of the electronically variable delay with said voltage function for adjusting the slave signal delay; and means for combining the master and delay adjusted slave signals.

16. The system claimed in claim 15 in which at least the slave reproducer has a servo for speed control and in which the system further comprises: means coupled to said slave servo, for comparing the master and slave signals and obtaining an approximate correspondence therebetween.

17. The system claimed in claim 16 further comprising: means for deriving an advance-retard signal for slave servo speed control from the most significant digit of the binary counter; and means coupled to said correlating means for enabling said signal upon an indication of correlation.

No references cited.

BERNARD KONICK, *Primary Examiner.*

A. I. NEUSTADT, *Assistant Examiner.*